TELEVISION RECEIVER SIGNAL PROCESSING CIRCUITS

Filed April 5, 1957

INVENTOR.
HUNTER C. GOODRICH &
MARSHALL C. KIDD
BY [signature]
ATTORNEY

United States Patent Office 2,906,817

Patented Sept. 29, 1959

2,906,817

TELEVISION RECEIVER SIGNAL PROCESSING CIRCUITS

Marshall C. Kidd, Haddon Heights, and Hunter C. Goodrich, Collingswood, N.J., assignors to Radio Corporation of America, a corporation of Delaware Application April 5, 1957, Serial No. 650,992

9 Claims. (Cl. 178—7.3)

This invention relates generally to improvements in television receiver signal processing circuits, and more particularly to television receiver circuits utilizing semi-conductor signal translating devices for processing the synchronizing pulse components of a composite television signal.

It has long been the practice to provide radio receiving systems with an automatic gain control (AGC) circuit to automatically adjust the gain of the receiving system as an inverse function of the received signal carrier amplitude. In amplitude modulated sound broadcast radio signal receiving systems this AGC action may be accomplished on the basis of available carrier amplitude since the modulation is substantially symmetrical with respect to an average zero modulating signal level. In television signal receiving systems, however, the problem is known to be complicated by the fact that the average carrier level as indicated in the receiver varies as a function of both the received signal amplitude and the direct current component or brightness component of the scene being televised. It is, therefore, frequently desirable to provide an AGC voltage developing circuit which is responsive only to a datum portion of the television signal. This datum portion usually comprises the peak excursion of the synchronizing pulses which are transmitted at a fixed predetermined percentage of the carrier modulation.

It is desirable to provide as much amplification as possible in the AGC channel consistent with economical design and construction so that a given change in the applied signal strength provides a greater incremental change in AGC voltage to maintain the video level at the kinescope more nearly constant.

Accordingly, it is an object of this invention to provide an improved AGC system for television receivers utilizing semi-conductor signal translating devices for providing increased amplification in the AGC channel without the requirement of additional AGC amplifier stages.

In the design and manufacture of television receivers, it is desirable to apply the signal developed at the output of the video amplifier to the AGC circuit in order that the AGC loop may take advantage of the full video gain. In most commercially used video amplifier circuits, however, a contrast control is provided which tends to defeat the AGC action. For example, as the contrast control is adjusted to provide greater video amplification the signal to the AGC circuit is also increased tending to provide greater AGC output. The greater AGC output voltage operates to reduce the RF and IF amplifier gain thus counteracting the change in gain of the video amplifier.

It is accordingly a further object of this invention to provide an improved AGC system for television receivers which operates to develop an AGC voltage from the signal output of a video amplifier of the type including a gain control, wherein the AGC voltage is unaffected by adjustments of the gain control.

In accordance with the invention, a video amplifier having degenerative circuit means such as a partially by-passed resistor in the emitter circuit thereof is connected to drive a synchronizing signal separator circuit (sync separator) and an automatic gain control circuit. The signal developed across the partially by-passed resistor is applied to a normally non-conducting semi-conductor amplifier device in one of the sync separator or AGC circuits so that the semi-conductor device saturates on the occurrence of synchronizing signal pulses. During saturation, the input impedance of the semi-conductor device is very low, and since this low input impedance is connected in parallel with the partially by-passed resistor, the degeneration of the video amplifier is effectively eliminated, thereby increasing the video amplifier gain during the sync pulse interval.

It is accordingly a further object of this invention to provide an improved video amplifier circuit for composite television signals which is operative to provide increased amplification of the synchronizing signal pulses relative to the picture components.

The novel features which are considered to be characteristic of this invention are set forth with particularity in the appended claims. The invention itself, however, both as to its organization and method of operation as well as additional objects and advantages thereof will best be understood from the following description when read in connection with the acompanying drawings in which:

Figures 1, 2, 3:
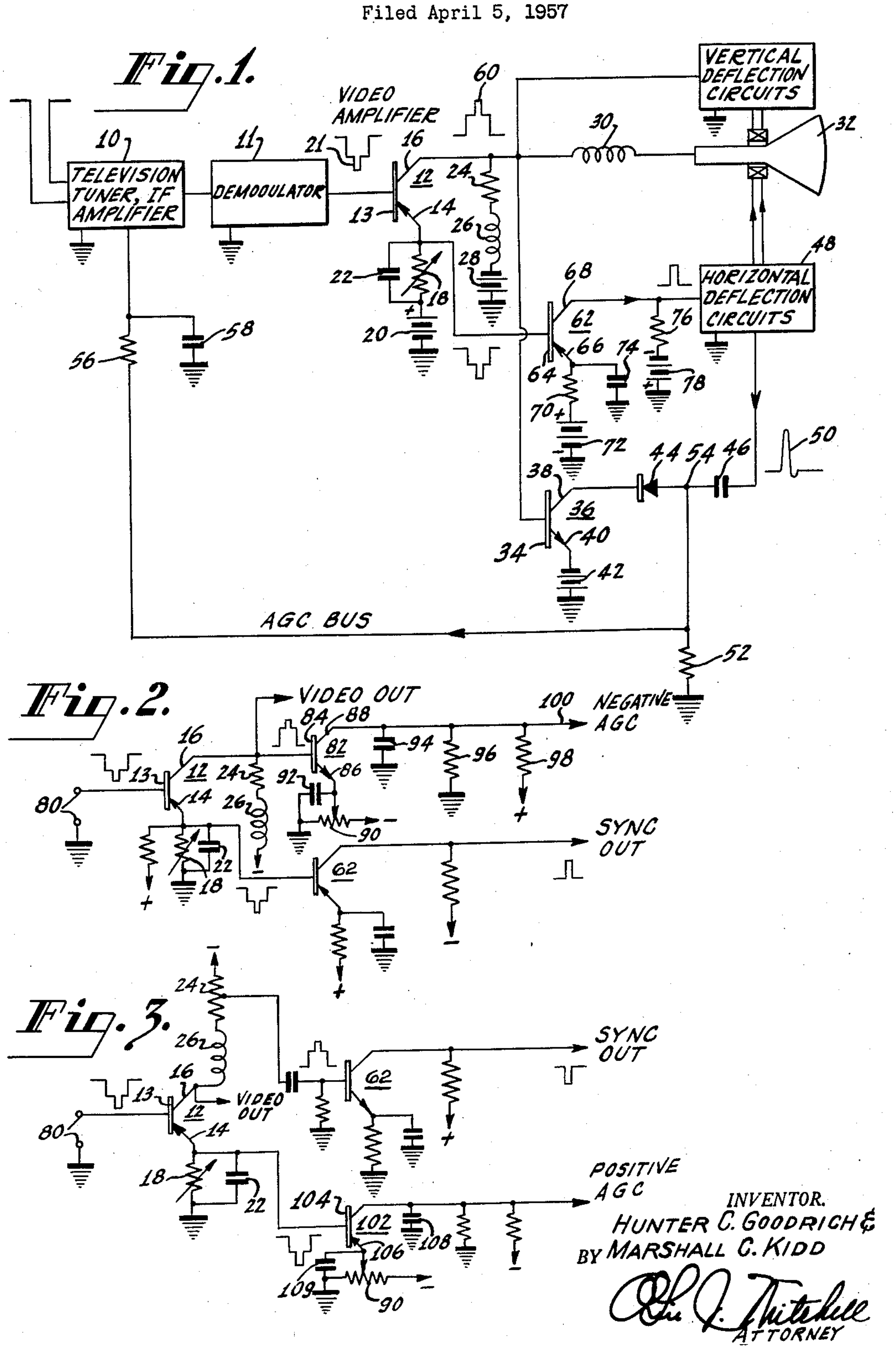
Figure 1 is a schematic circuit diagram partly in block form, of television receiver signal processing circuits including a video amplifier driving on automatic gain control circuit and separator circuit, in accordance with one embodiment of the present invention.
Figure 2 is a schematic circuit diagram of a modification of the television receiver signal processing circuit shown in Figure 1 which employs a different type of automatic gain control circuit.
Figure 3 is a schematic circuit diagram of a still further modification of a television receiver signal processing system embodying the invention.

Referring to the drawings wherein like reference characters are used to designate like elements throughout the various figures, and particularly to Figure 1, a conventional system is provided for receiving and demodulating a transmitted television carrier wave. The system may comprise, as the legend indicates, a television tuner and intermediate frequency signal amplifier portion 10 for initially processing the received carrier wave, and a demodulator portion 11 whereby the composite video signal is recovered from the carrier wave.

The composite video signal is coupled in a suitable manner to a video amplifier including a semi-conductor amplifier device which is shown as a PNP type transistor 12 having a base 13, an emitter 14 and a collector 16. The emitter 14 of the transistor 12 is connected through a variable resistor 18 which provides a contrast control for the receiver, and a battery 20 to a point of fixed reference potential such as ground. A capacitor 22 is connected in parallel to the resistor 18 to provide a partial by-pass for signals in the video frequency range. Since the resistor 18 is only partially by-passed, a certain amount of degeneration is produced which improves the performance of the video amplifier by increasing the input impedance thereof and boosts the high frequency video response. Although this degeneration reduces the video amplifier gain, it will be understood that a certain amount of gain must be sacrificed in order to obtain the band-width of operation (on the order of 4 megacycles) ordinarily required for high quality picture reproduction.

The collector electrode 16 of the transistor 12 is connected through a resistor 24 and a peaking coil 26 to the negative terminal of an operating potential supply indicated by the battery 28. The amplified video signal is applied through the inductor 30 to the input electrode of a kinescope 32 to develop an image of the televised object.

The collector electrode 16 of the video amplifier transistor 12 is connected to the base 34 of a semi-conductor amplifier device 36 which operates as a keyed AGC amplifier. The semiconductor amplifier device 36 as is shown as a junction type NPN transistor and in addition to the base 34 includes a collector electrode 38 and an emitter electrode 40. The emitter electrode 40 is connected to the negative terminal of the source of biasing potential shown as a battery 42 which is selected to bias the emitter-base circuit of the transistor 36 sufficiently in a reverse direction to maintain the transistor 36 non-conductive except upon the occurrence of signals applied to the base 34 having an amplitude exceeding the blanking level of a composite video signal such as synchronizing signal pulses. The collector 38 is connected by way of a rectifier 44 and a capacitor 46 to a point in the horizontal deflection circuits 48 which provides a keying pulse occurring coincidentally with the received synchronizing pulses. The keying pulses which are represented by the waveform 50 may be derived from a winding on the horizontal output transformer and are applied to the semi-conductor device 36 in a polarity to bias the collector-base circuit thereof in a reverse direction as required for normal transistor amplification.

Upon coincidence of a keying impulse and a synchronizing pulse, the transistor 36 conducts current to charge the capacitor 46. In the interval between synchronizing pulses the capacitor 46 discharges through a resistor 52 which is connected from the junction of the capacitor 46 and the rectifier 44 to ground. As will be explained hereinafter, the desired AGC voltage is developed at the junction 54, and is applied by way of a filter network comprising a resistor 56 and a capacitor 58 to the television tuner and IF amplifier 10 portion of the television receiver.

The composite video signal appearing at the emitter 14 of the video amplifier 12 is coupled directly to a synchronizing signal separator circuit including a semi-conductor amplifier device 62. The semi-conductor amplifier device 62 which is shown as a PNP type junction transistor includes a base 64, an emitter 66, and a collector 68. The emitter 66 is connected through a biasing resistor 70 to the positive terminal of an operating potential supply which is shown as a battery 72. The resistor 70 coacts with a capacitor 74 which is connected between the emitter 66 and ground to develop a biasing voltage between the emitter 66 and base 64 which maintains the transistor 62 non-conductive for signals of an amplitude below that of the blanking level of the composite video signal. The circuit is designed so that the transistor 62 is driven from the normally cut-off condition into saturation by the synchronizing pulses, so that the synchronizing signals are double clipped. The separated synchronizing signal pulses are developed across a load resistor 76 which is connected between the collector 68 and the negative terminal of an operating potential supply means shown as a battery 78. These synchronizing pulses are applied to the horizontal deflection circuits 48 to control the line scansion rate of the cathode ray beam in the kinescope 32 in synchronism with that of the transmitted television image signal.

In the operation of the signal processing circuit of the invention, the composite video signal is applied to the base 13 of the video amplifier transistor 12 so that the synchronizing signal excursions 21 are in a negative direction. The video signal is amplified in the video amplifier circuit and applied to the kinescope to reproduce the desired picture information. As explained above, the resistor 18, capacitor 22 network produces a certain amount of degenerative signal feedback from the output circuit to the input circuit of the video amplifier 12 which reduces the gain from that which is obtained in the absence of such degeneration. By way of example the resistor 18 may have a resistance on the order of 150 ohms and the capacitor 22 has a capacitance on the order of 100–200 $\mu\mu$farads. However, during a horizontal synchronizing pulse interval, the sync separator transistor 62 is driven into saturation providing a very low impedance between the emitter 66 and the base 64. This provides a low impedance path to ground for the emitter 14 through the base-emitter path of the synchronizing signal separator and the capacitor 74. Since the circuit including the resistor 18 and the capacitor 22 is effectively by-passed during the synchronizing signal pulse interval the degenerative action is eliminated and the video amplifier 12 provides greater gain to amplify the synchronizing signal pulses to a greater extent than the image intelligence portions of a television signal. In other words, the synchronizing signal pulse appearing at the collector 16 of the video amplifier is stretched in amplitude relative to the remainder of the video signal components. The amplified synchronizing pulse is then applied to the AGC circuit for developing of the desired control voltage. Since the value of the AGC voltage developed depends on the synchronizing signal amplitude, and since the potentiometer 18 is effectively shorted out during the synchronizing pulse interval as above explained, variations in the contrast setting of the potentiometer 18 do not effect the resulting AGC voltage.

In describing the operation of the pulsed AGC amplifier it should be noted that the amplitude of the radio frequency carrier is held constant during the transmission of all blanking and sync impulse information. During the transmission of image intelligence of a television signal, that is, during each line interval between successive blanking signals, the average amplitude of the transmitted radio frequency carrier is a function of the average light contained in the television image. Accordingly, if the reproduced image is to be predominantly dark, the average carrier amplitude will necessarily be greater than would be the case if the background level of the image were considerably lighter, such action of course is true only in the negative system of transmission wherein white picture information is transmitted at a lower carrier level than black level information. It is expedient in order that the control of the gain of the receiver be in accordance with the proper aspects of the carrier, that the automatic gain control potential be developed such that its magnitude is a function of the intensity of the received carrier of the television signal during the blanking or sync intervals only and, as hereinbefore brought out, not during the transmission of the picture or line information.

In order to extract carrier strength information from the television signal at periods corresponding to blanking or sync intervals use may be made of keyed circuits which translate signal information only during the keyed state of the circuit. In this manner, an automatic gain control potential may be developed which is substantially free of noise effects and is to be much preferred over the automatic gain control action derived from simple peak rectifier systems which are quite vulnerable to spurious energy bursts at any time during the reception of the signal.

Since the transistor 36 as mentioned above is an NPN junction type transistor, the video signal is applied to the base 34 so that the synchronizing signal pulse excursions are in a positive direction as shown by the wave form 60, tending to provide a forward base-emitter bias. The bias between the emitter 40 and the base 34 due to the batteries 28 and 42 is selected to be in a reverse direction for signal amplitudes of less than blanking. Simultaneously with the occurrence of the sync pulse 60, the positive flyback pulse shown in the wave form 50 is applied to the collector 38 causing the semi-conductor device 36 to conduct and charge the capacitor 46. The amount of collector current charging the capacitor 46 during the flyback pulses is determined by the relative amplitude of the synchronizing signal applied to the base 34. Between pulses, the capacitor 46 discharges through the resistor 52 developing a negative AGC potential at the terminal point 54 which is applied through the resistor-capacitor filter combination 56 and 58 respectively to control the gain of the tuner and IF amplifier portions 10 of the television receiver.

The rectifier 44 which is shown as a germanium semi-conductor such as a 1N54 is inserted in the circuit between the capacitor 46 and the collector 38 to prevent the negative charge developed on the capacitor 46 from leaking off through the low collector to base impedance of the transistor 36.

The AGC circuit described has good temperature stability since the temperature effects on the rectifier tend to counteract the temperature effects on the semi-conductor device 36. For example, at a given signal level, an increase in temperature increases the reverse leakage through the rectifier 44 between pulses, and therefore reduces the AGC voltage. On the other hand, the increased temperature tends to increase the collector current flowing through the transistor 36 during the flyback pulses which tends to raise the AGC voltage.

The embodiment of the invention shown in Figure 2 is similar to that described in connection with Figure 1 except that a different type of AGC circuit is used. The video amplifier 12 and synchronizing signal separator circuits shown in Figure 2 are the same as those shown in Figure 1 except that the individual batteries shown in Figure 1 have been replaced by a common power supply which is indicated by positive and negative terminals respectively. Naturally, if desired, separate positive and negative power supplies may be provided.

A demodulated television signal wave is applied through a pair of terminals 80 to the input circuit of the video amplifier 12 which includes the degenerative circuit means including the resistor 18 and the capacitor 22. A portion of the video signal appearing at the emitter 14 is applied to the sync separator as described in connection with Figure 1. The amplified video signal appearing at the collector 16 is applied to the AGC amplifier. The AGC amplifier comprises a transistor 82 having a base 84, emitter 86, and collector 88. The emitter 86 is connected to an adjustable tap of a potentiometer 90 which is connected between the negative terminal of a power supply and ground. The slider is by-passed to ground for synchronizing signal pulses by a capacitor 92.

The potentiometer 90 provides an AGC threshold setting for the receiver which determines the received signal amplitude level at which the AGC circuit begins to develop a control voltage. The emitter 86, base 84 bias is adjusted so that a forward bias is applied to the semi-conductor device 82 only in the presence of signal amplitudes in excess of the blanking amplitude of a composite television signal. Upon the occurrence of the synchronizing signal pulse, the emitter-base junction is biased in a forward direction so that the semi-conductor 82 conducts to charge the capacitor 94 to a level depending on the amplitude of the applied synchronizing pulse. During the period between successive synchronizing pulses, the semi-conductor device 82 is non-conductive and the capacitor 94 discharges through the resistors 96 and 98. The time constant of the capacitor 94, resistors 96, 98 all selected to be relatively long with respect to the period between successive horizontal pulses so that a relatively constant negative AGC potential is developed at the output terminal 100.

Other than the AGC circuit described above, the overall operation of the system shown in Figure 2 is the same as that described in connection with Figure 1, wherein the partially bypassed emitter resistor 18 is effectively shorted out during the synchronizing signal impulse interval so that maximum amplification of the synchronizing pulse is effected in the video amplifier 12. As explained above, the additional amplification in the AGC loop provides a greater incremental change in AGC voltage for a given change in the applied signal strength to maintain the video level at the kinescope more nearly constant.

Referring now to Figure 3, the driving connections for the sync separator circuit and the automatic gain control circuit have been reversed. As shown in Figure 3 the sync separator circuit is driven from the collector of the video amplifier 12, and the AGC amplifier 102 provides the low impedance path in parallel with the degenerative circuit comprising the resistor 18 and capacitor 22 during the synchronizing pulse interval. Ordinarily the AGC amplifier has a reverse base-emitter bias. That is, the base 104 is positive with respect to the emitter 106. However, the circuit is designed so that the synchronizing pulses drive the base 104 negative with respect to the emitter 106. During the synchronizing pulse interval the transistor 102 conducts to charge up the AGC capacitor 108 as described above, and at the same time the emitter 14 of the video amplifier is connected to ground through the capacitor 109 and the low impedance base 104-emitter 106 path. As explained above, this action stretches the sync pulse amplitude relative to the image intelligence components of a composite video signal. The amplified video signal is then applied to the sync separator 62 which is connected with the collector 16 of the video amplifier 12.

In transistor signal receivers, since it is possible to use either PNP or NPN type transistors as the R.F. and I.F. amplifiers, it is desirable in some cases to provide other than the negative gain control voltage. If the R.F. and I.F. amplifier stages employing semi-conductor amplifiers of the PNP type a positive going control voltage with increasing signal amplitude (for base control) would be desirable. In the circuit shown in Figure 3 of the AGC amplifier including the PNP type transistor 102 produces a positive going AGC control potential. The operation of the AGC circuit of Figure 3 is otherwise the same as that described in Figure 2 above. It can be noted that the only circuit changes to obtain the positive control potential are the provision of an opposite conductivity transistor, and an operating potential supply of opposite polarity.

The transistorized television receiver signal processing circuit described provides a simple and effective means for providing increased amplification of the synchronizing pulse components of a television video signal relative to the picture components, thereby enabling a more simplified and economical receiver design without sacrificing the receiver performance.

What is claimed is:

1. In a television receiver, a video amplifier for composite video television signals having a recurrent synchronizing pulse component defined by signal intelligence excursions of amplitudes greater than associated image intelligence excursions, a signal input circuit connected with said video amplifier, degenerative circuit means connected in series with said input circuit, a semi-conductor amplifier device having base and emitter electrodes, means connecting asid emitter-to-base current path of said semi-conductor device in parallel with said degenerative circuit means, means connected in said emitter-to-base current path for biasing said semi-conductor device for conduction between said emitter and base electrodes in response to the synchronizing pulse components of said video signals to provide a low impedance path in parallel with said degenerative circuit means thereby effectively disabling said degenerative circuit means during the synchronizing pulse intervals, a signal output circuit connected with said video amplifier, said synchronizing pulse utilization means connected with said output circuit.

2. In a television receiver, a video amplifier comprising a signal translating device having an input electrode, an output electrode, and a common electrode; a signal input circuit for composite television signals having a recurrent synchronizing pulse component defined by signal intelligence excursions of amplitudes greater than associated image intelligence excursions connected between said input electrode and said common electrode of said video amplifier; a signal output circuit connected between said output electrode and said common electrode; degenerative circuit means comprising a resistor common to said input circuit and said output circuit; a semi-conductor amplifier device having base and emitter electrodes; means connecting the emitter-to-base current path of said semi-conductor device in parallel with said resistor, means connected in said emitter-to-base current path for biasing said semi-conductor device for conduction between said base and emitter electrodes in response to synchronizing pulse components of said video wave to provide a low impedance path in parallel with said resistor during synchronizing pulse intervals, thereby effectively disabling said degenerative circuit means; and synchronizing pulse utilization means connected to said output circuit.

3. A television receiver signal processing circuit comprising in combination, a video amplifier including a transistor having emitter, base and collector electrodes; a signal input circuit connected between said base and emitter electrodes; a signal output circuit connected between said collector and emitter electrodes; means providing degenerative feedback in said video amplifier comprising a partially bypassed resistor common to said input circuit and said output circuit; a semi-conductor amplifier having base and emitter electrodes; means connecting the emitter-to-base current path of said semi-conductor amplifier in parallel with said resistor, means connected in said emitter-to-base current path for biasing the emitter-to-base circuit of said semi-conductor amplifier device for conduction in response to the synchronizing pulse components of said video wave to provide a low impedance path in parallel with said resistor during the sync pulse intervals; and the synchronizing pulse utilization means connected to said output circuit.

4. A television receiver signal processing circuit comprising in combination, a video amplifier for composite television signals including a transistor having emitter, base and collector electrodes; a signal input circuit connected between the base electrode of said video amplifier transistor and a point of reference potential; a signal output circuit connected between the collector electrode of said video amplifier transistor and said point of reference potential; impedance means connected between said emitter electrode and said point of fixed reference potential providing a degenerative signal feedback from said output circuit to said input circuit thereby reducing the gain of said amplifier; a synchronizing signal separator circuit including a transistor having emitter, base and collector electrodes; means connecting the base electrode of the synchronizing signal separator transistor with the emitter electrode of said video amplifier transistor, means providing a low impedance path to signal currents connected between the emitter electrode of said synchronizing signal separator transistor and said point of reference potential; means biasing said synchronizing signal separator to a normally non-conductive condition during the image intelligence portions of a composite video signal and to be conductive in response to synchronizing pulse components of a composite video wave developed across said impedance means to provide a low impedance path from said video amplifier emitter electrode to said point of reference potential during a synchronizing pulse interval; and synchronizing pulse utilization means connected with said output circuit.

5. A television receiver processing system comprising in combination, a video amplifier for composite television signals including a transistor having emitter, base and collector electrodes; a signal input circuit connected between the base of said video amplifier transistor and ground for said system; a signal output circuit connected between the collector electrode of said video amplifier transistor and ground; means including a resistor connected between the emitter electrode of said video amplifier and ground providing a degenerative signal feedback from said output circuit to said input circuit thereby reducing gain of said video amplifier; an automatic gain control responsive to the synchronizing pulse components of a composite video wave to develop a control voltage representative of the relative synchronizing pulse amplitude, said automatic gain control circuit including a transistor having emitter, base and collector electrodes; means providing low impedance to signal currents connecting the emitter electrode of said automatic gain control transistor to ground; means connecting base electrode of said automatic gain control transistor with the emitter electrode of said video amplifier transistor whereby video signals developed across said resistor are applied between the base and emitter of said automatic gain control transistor; means biasing said automatic gain control transistor to provide a reverse base-emitter bias in response to image intelligence portions of a video signal and to provide a forward base-emitter bias in response to synchronizing pulse components of a composite video wave thereby effectively eliminating said degenerative signal feedback by providing a low impedance path from said video amplifier emitter electrode to ground; and a synchronizing signal separator circuit for separating the synchronizing pulse components from the video wave connected with said video amplifier output circuit.

6. In a television receiver signal processing system of the type comprising a video amplifier for composite television signals including a transistor having emitter, base and collector electrodes, a signal input circuit connected between the base electrode of said video amplifier transistor and a point of reference potential, a signal output circuit connected between the collector electrode of said video amplifier transistor and said point of reference potential, circuit means including a resistor connected between said emitter electrode and said point of fixed reference potential for said amplifier providing a degenerative signal feedback from said output circuit to said input circuit thereby reducing the gain of said amplifier; means for increasing the gain of said amplifier during the synchronizing pulse interval of a composite video wave comprising a synchronizing signal separator circuit for separating the synchronizing pulse component from a composite video wave, said synchronizing signal separator circuit including a transistor having emitter, base and collector electrodes; means connecting the base electrode of the synchronizing signal separator transistor with the emitter electrode of said video amplifier transistor, means providing a low impedance path to signal currents connected between the emitter electrode of said synchronizing signal separator transistor and said point of reference potential; means biasing said synchronizing signal separator base emitter circuit in a reverse direction during the image intelligence portions of a composite video signal and in a forward direction in response to synchronizing pulse components of a composite video wave developed across said resistor, said base-emitter circuit of said automatic gain control transistor when biased in a forward direction provides a low impedance signal current path from said video amplifier emitter electrode to said point of reference potential thereby effectively eliminating said degenerative feedback and increasing the gain of said video amplifier during a synchronizing pulse interval; and an automatic gain control circuit means responsive to the synchronizing pulse components of a video wave for developing a gain control potential for said television receiver connected with said output circuit.

7. In a television receiver signal processing circuit of the type including a video amplifier including a transistor having emitter, base and collector electrodes, a signal input circuit connected between said base and emitter electrodes, a signal output circuit connected between said collector and emitter electrodes, means providing a degenerative signal feedback circuit including an impedance element common to said input circuit and said output circuit; means for increasing the gain of said video amplifier during the synchronizing pulse components of a video signal comprising a second transistor of the same conductivity type as said video transistor, said second transistor having base and emitter electrodes; means connecting the emitter-to-base current path of said second transistor in parallel with said impedance element, means providing a reverse emitter-to-base bias in response to image intelligence portions of a composite video signal and a forward emitter-to-base bias in response to the synchronizing pulse components of said video wave to provide a low impedance path in parallel with said impedance element during the sync pulse intervals thereby effectively disabling said degenerative feedback circuit and increasing the video amplifier gain during the synchronizing pulse interval.

8. In a television receiver signal processing circuit of the type including a video amplifier for composite television signals including a PNP transistor having emitter, base, and collector electrodes, a signal input circuit connected between the base electrode of said video amplifier transistor and a point of reference potential; a signal output circuit connected between the collector electrode of said video amplifier transistor and said point of reference potential, a variable resistor providing a contrast control connected between said emitter electrode and said point of fixed reference potential for said video amplifier, capacitance means connected in parallel with said resistor and providing only a partial bypass for video signals resulting in a degenerative signal feedback from said output circuit to said input circuit thereby reducing the gain of said video amplifier; means for increasing the gain of said video amplifier during a synchronizing pulse interval comprising a synchronizing signal separator circuit including a PNP type transistor having emitter, base and collector electrodes; means connecting the base electrode of the synchronizing signal separator transistor with the emitter electrode of said video amplifier transistor, means providing a low impedance path to signal currents connected between the emitter electrode of said synchronizing signal separator transistor and said point of reference potential; means biasing said synchronizing signal separator to be normally non-conductive during the image intelligence portions of a composite video signal and to be conductive in response to synchronizing pulse components of a composite video wave developed across said variable resistor to provide a low impedance path from said video amplifier emitter electrode to said point of reference potential during a synchronizing pulse interval, thereby effectively eliminating said degenerative signal feedback and increasing the gain of said video amplifier during a synchronizing pulse interval; and an automatic gain control circuit responsive to synchronizing pulse components of a video wave to develop a control voltage for said receiver connected with said video amplifier output circuit.

9. In a television receiver, a video amplifier comprising a signal translating device having an input electrode, an output electrode, and a common electrode; a signal input circuit for composite television signals having a recurrent synchronizing pulse component defined by signal intelligence excursions of amplitudes greater than associated image intelligence excursions connected between said input electrode and said common electrode of said video amplifier; a signal output circuit connected between said output electrode and said common electrode; degenerative circuit means comprising a variable resistor common to said input circuit and said output circuit, said variable resistor providing a contrast control for said video amplifier; a semi-conductor amplifier device having base and emitter electrodes, means connecting the base-to-emitter current path of said semi-conductor device in parallel with said resistor for receiving the video signal developed across said variable resistor; means providing a forward base-to-emitter bias in response to synchronizing pulse components of the video wave whereby said base-to-emitter path provides a low impedance path effectively short-circuiting said variable resistor during synchronizing pulse intervals.

References Cited in the file of this patent

UNITED STATES PATENTS

| | | |
|---|---|---|
| 2,654,799 | Wendt | Oct. 6, 1953 |
| 2,708,687 | Schlesinger | May 17, 1955 |
| 2,717,931 | Duke | Sept. 13, 1955 |